United States Patent

Van Veldhuizen

[15] 3,678,860
[45] July 25, 1972

[54] TRACK LOCKING DEVICE FOR AIR CUSHION VEHICLES

[72] Inventor: John Van Veldhuizen, Rte. 2 Box 54, Unionville, Tenn. 37180

[22] Filed: July 6, 1970

[21] Appl. No.: 52,257

[52] U.S. Cl. .......................... 104/23 FS, 104/134, 105/140
[51] Int. Cl. ....................................................... B61b 13/08
[58] Field of Search ............... 104/23 FS, 134, 118, 120; 105/140, 145

[56] References Cited

UNITED STATES PATENTS

| | | | |
|---|---|---|---|
| 3,595,171 | 7/1971 | Sheppard | 104/23 FS |
| 3,119,349 | 1/1964 | Hampton | 104/23 FS |
| 3,516,362 | 6/1970 | Paris | 104/23 FS |
| 3,575,116 | 4/1971 | Hart | 104/23 FS |
| 3,580,181 | 5/1971 | Bertin | 104/23 FS |
| 3,168,875 | 2/1965 | Reed | 104/134 |
| 3,012,521 | 12/1961 | Lich | 104/118 |
| 3,369,497 | 2/1968 | Driver | 104/23 FS |
| 3,111,093 | 11/1963 | Jay | 104/23 FS |
| 310,356 | 1/1885 | Alcoke | 104/246 |

Primary Examiner—Drayton E. Hoffman
Assistant Examiner—D. W. Keen
Attorney—Clarence A. O'Brien and Harvey B. Jacobson

[57] ABSTRACT

An air propelled vehicle including one or more lengthwise arranged and/or articulated cars each defining a longitudinally extending and downwardly opening channel for embracingly receiving a monorail therein of the type including a transversely enlarged upper horizontal portion including opposite side longitudinally extending undersurface portions. Each of the cars includes means for pumping air downwardly into the channel defined thereby in order to form a cushion of air between the upper surface of the monorail and the undersurface of the car. Also, each of the cars includes lower opposite side skirt portions defining the lower opposite side extremities of the corresponding channel and which are supported from the car for swinging movement inward beneath the opposite side longitudinally extending undersurface portions of the monorail, thereby locking each car against upward movement relative to the monorail. Finally, each of the inwardly swingable skirt portions includes roller means which project upwardly therefrom when the skirt portions are swung inwardly and are rollingly engageable with the opposite side longitudinally extending undersurface portions of the monorail.

4 Claims, 4 Drawing Figures

Patented July 25, 1972
3,678,860
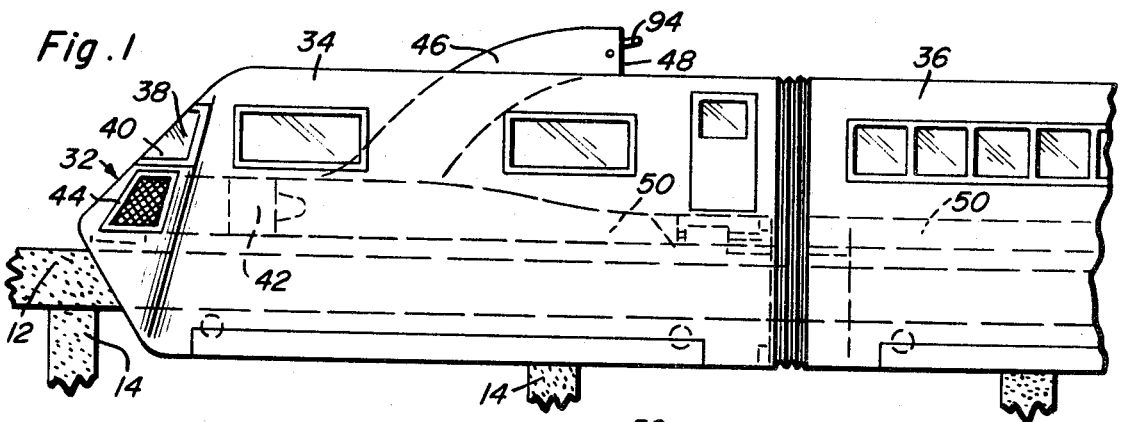
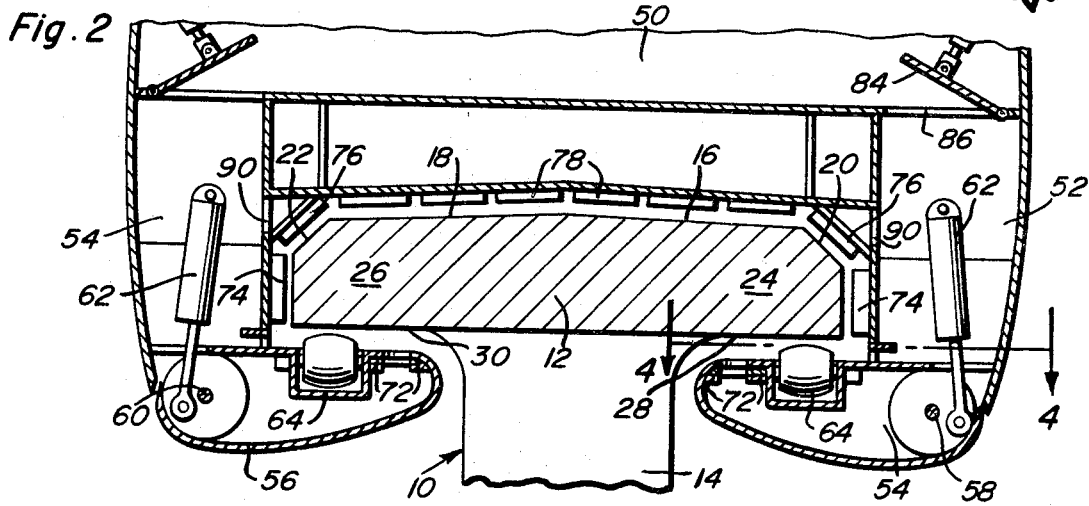
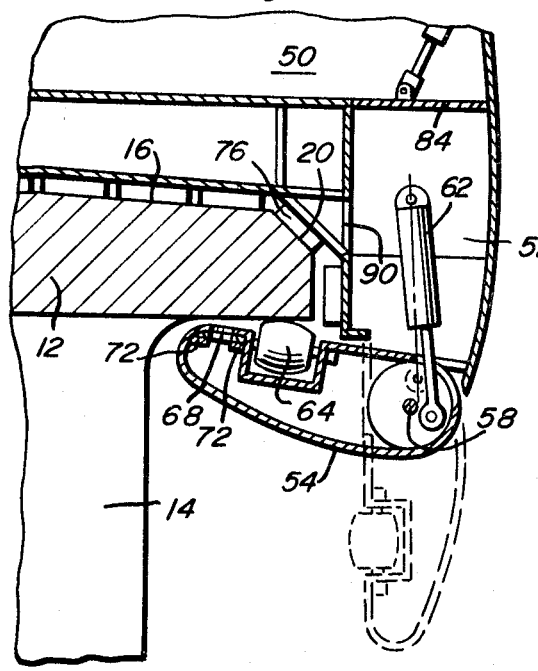
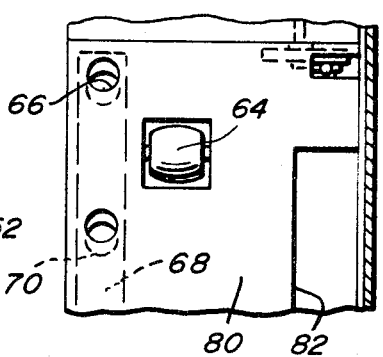
John Van Veldhuizen
INVENTOR
BY Clarence A. O'Brien
and Harvey B. Jacobson
Attorneys

TRACK LOCKING DEVICE FOR AIR CUSHION VEHICLES

The monorail or air cushion vehicle of the instant invention comprises an improvement over the jet propelled air cushion monorail vehicle disclosed in my copending U.S. application Ser. No. 861,614, filed Sept. 29, 1969 now U.S. Pat. No. 3,595,172 issued July 29, 1971. Many of the basic structural and operational components of the instant invention are similar to corresponding components of the monorail vehicle disclosed in my above mentioned copending application. The improvements represented by the instant invention reside in the provision of a monorail vehicle adapted for use in conjunction with a slightly modified monorail structure and including retractable skirt portions for positively interlocking the monorail vehicle with the modified monorail structure. The instant invention also includes additional air cushion forming means for forming an air cushion between the folded under skirt portions of the monorail vehicle and the opposing monorail undersurface portions whereby the formation of an air cushion above the monorail structure and between the latter and the opposing vehicle portions will not result in the monorail vehicle being "floated" excessively above the monorail structure.

The monorail vehicle utilizes a power source in the leading car of a train of cars and the power source is capable of providing large quantities of high velocity air. The leading car includes a rearwardly facing outlet for propelling the lead car and thus the train and the outlet is provided with means for throttling the discharge of air from the outlet. In addition, all cars of the monorail trains are provided with interconnected longitudinal air plenum chambers or passageways into which a portion of the high velocity air produced by the power source is ducted and each of the cars of the train includes structure for discharging variable amounts of this ducted air into the space between the associated monorail and the opposing undersurface portions of the monorail cars, whereby to form a cushion of air beneath each monorail car for support of that car on an air cushion above the associated monorail. As above set forth each car is also provided with depending opposite side skirt portions which may be swung inwardly to underlie opposite side portions of the associated monorail and to thus lock the car upon the rail and means is provided whereby each skirt portion is communicated with the air ducted longitudinally through the car. Further, each skirt portion includes means for discharging variable amounts of air ducted thereto upwardly against the associated undersurface monorail portions.

The main object of this invention is to provide an efficient high speed monorail vehicle which will be capable of operation with a minimum of noise and which will be fully guidingly supported from the associated monorail structure by means of air cushions formed between the monorail structure and the opposing surfaces of the monorail vehicle.

Another object of this invention is to provide a monorail vehicle in accordance with the preceding object and which may comprise a plurality of end to end aligned and articulatively coupled individual cars each provided with means for forming an air cushion therebeneath with air supplied by and ducted from the lead car of the monorail train.

Still another object of this invention is to provide a monorail car including opposite side inwardly directed skirt portions for underlying opposite side marginal portions of an associated monorail and which are swingable from the inwardly projecting positions underlying the opposite side monorail portions to substantially vertical positions between which the full width of the associated monorail structure is receivable.

A final object of this invention to be specifically enumerated herein is to provide a monorail vehicle in accordance with the preceding objects which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational view of the forward end portion of a monorail train system constructed in accordance with the present invention;

FIG. 2 is a fragmentary enlarged transverse vertical sectional view of the lower monorail car structure and the upper monorail portion and with the pivoted skirt portions of the monorail car in horizontally inwardly projecting operative positions;

FIG. 3 is a fragmentary enlarged transverse sectional view similar to the right side of FIG. 2 but with the downwardly swung position of the skirt portion illustrated in phantom lines and the air gate for ducting air cushion forming air into the skirt portions in the closed position; and FIG. 4 is a fragmentary horizontal sectional view taken substantially upon the plane indicated by the section line 4—4 of FIG. 2.

Referring now more specifically to the drawings the numeral 10 generally designates a monorail structure including end to end aligned and joined horizontal rail sections 12 which are supported at a point spaced longitudinally therealong by means of central standards 14. The rail sections 12 include beveled opposite side upwardly facing surfaces 16 and 18 and the extreme outer longitudinal corners of the rail sections 12 are beveled as at 20 and 22. Further, the rail sections 12 include opposite side marginal portions 24 and 26 which extend outwardly beyond the standards 14 and which include coplanar horizontal under surfaces 28 and 30. The monorail structure 10 may be constructed of any suitable material such as various cementitious materials.

The monorail vehicle of the instant invention is generally referred to by the reference numeral 32 and includes a lead car 34 and a plurality of other cars 36 disposed in end to end aligned relation behind the lead car 34. Adjacent ends of the lead car 34 and the other cars 36 are coupled together in any convenient manner (not shown) and it is to be understood that each of the cars 34 and 36 defines a vehicle body and may have provisions therein for passengers.

The lead car 34 includes a forward driver's compartment 38 provided with a windshield 40 and the interior of the lead car has a pair of opposite side motor driven blower means 42 disposed therein. The car 34 includes air intakes 44 for the blower means 42 and a rearwardly and upwardly curving duct portion 46 including a rear discharge end 48. High velocity air provided by the blower means 42 is in part ducted upwardly through the duct portions 46 and discharged rearwardly from the discharge end 48 in order to provide propulsion force for the lead car 34 and thus the monorail vehicle 32. In addition, the cars 34 and 36 include communicated longitudinally extending air plenum chambers 50 also into which a portion of the discharge of high velocity air from the blower means 42 is ducted. Each of the cars 34 and 36 further includes a pair of depending hollow opposite side portions 52 and 54 to whose lower ends a pair of opposite side hollow skirt portions 54 and 56 are pivotally secured as at 58 and 60.

A plurality of extendable fluid motors 62 are operatively connected to each of the opposite side portions 52 and 54 and the corresponding skirt portions 54 and 56 whereby the skirt portions may be swung between the solid line position illustrated in FIG. 3 of the drawings and the phantom line position illustrated in FIG. 3 of the drawings. Any suitable means (not shown) may be provided for powering the cylinders or motors 62. Further, each of the skirt portions 54 and 56 includes at least one pair of opposite end rollers 64 which are rollingly engageable with the undersurface portions of the opposite sides 28 and 30 of the rail sections 12. Further, each of the skirt portions 54 and 56 additionally includes a plurality of longitudinally spaced air outlet openings 66 and an elongated shutter plate 68 having a plurality of longitudinally spaced openings 70 formed therein. The shutter plates 68 are shiftable longitudinally of the skirt portions 54 and 56 between positions with the openings 70 out of registry with the openings 66 and positions with the openings 70 in varying degrees of registry with the openings 66. Any suitable means (not shown) may be provided for longitudinally shifting the shutter plates 68 and the latter are guidingly supported from guide portions 72 carried by the corresponding skirt portions 54 and 56.

Each of the opposite side portions 52 and 54 is provided with pairs of opposite end removable guide pads 74 and 76 and the undersurface of each car 34 and 36 includes a plurality of transversely spaced rows of longitudinally spaced removable guide pads 78 which oppose the beveled surfaces 16 and 18. The pads 76 oppose the surfaces 20 and 22 and the pads 74 oppose the vertical opposite side surfaces of the rail sections 12. The pads 74, 76 and 78 may be removed and replaced when desired.

The inner wall portions 80 of the skirt portions 54 and 56 include longitudinally extending openings 82 formed therein and motor controlled flaps controlling the flow of air through longitudinal opposite side openings 86 are provided whereby air from the air plenum chamber 50 may be ducted downwardly through the opposite side portions 52 and 54 and into the skirt portions 54 and 56 for discharging through the openings 66 when the openings 70 are at least partially registered with the openings 66.

In operation, the blower means functions to discharge high velocity air through the discharge end 48 of the duct portion 46 in order to propel the monorail vehicle 32 forwardly. In addition, air from the blower means 42 is ducted through the openings 86 and down into the opposite side portions 52 as well as the skirt portions 54. The opposite side portions 52 also include openings 90 which open into a downwardly opening channel defined by each of the cars 34 and 36. Accordingly, sufficient air may be discharged inwardly of the opposite side portions 52 and 54 in order to form a load supporting air cushion between the upper and opposite side surfaces of the rail sections 12 and the opposing surfaces of the cars 34 and 36. Thus, the vehicle 32 is propelled forwardly and supported by air.

When the vehicle 32 is moving at speed, the skirt portions 54 and 56 are swung inwardly to the positions thereof illustrated in FIG. 2 of the drawings whereupon cars 34 and 36 are locked to the rail sections 12 and any tendency of the cars 34 and 36 to "float" to high above the rail sections 12 is prevented by the skirt portions 54 and 56 and the rolling contact of the rollers 64 supported from the skirt portions with the undersurface portions 28 and 30 of the rail sections 12.

In order to slow the monorail vehicle 32, the discharge flap 94 carried by the discharge end of the duct portion 46 may be swung to a closed position and thus the speed of the vehicle 32 will be reduced. However, if it is desired to rapidly decelerate the vehicle 32, the motors 62 are extended slightly beyond the positions thereof illustrated in FIG. 2 of the drawings to positions thereof illustrated in FIG. 3 of the drawings where upon the rollers 64 contact the undersurface portions 28 and 30 of the rail sections 12 and pull the cars 34 and 36 downwardly until the pads 76 and 78 frictionally engage the surfaces 16, 18, 20 and 22 of the rail sections. In this manner, rapid deceleration of the vehicle 32 may be accomplished.

When it is desired to remove either the cars 34 and 36 from the monorail structure 10, the skirt portions 54 and 56 may be swung to the phantom line position thereof illustrated in FIG. 3 of the drawings whereupon the cars 34 and 36 may be lifted from the monorail 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated monorail member including upper surface portions as well as opposite side generally horizontal downwardly facing lower surface portions, a monorail vehicle including a car body defining a longitudinal downwardly opening channel defined between depending opposite sides of said car body and in which said monorail member is embracingly received, said depending vehicle opposite sides including lower hollow panel-like skirt portions supported for inwardly swinging beneath said lower surface portions to thereby interlock said vehicle on said monorail member against unrestricted upward movement relative to said monorail member, said opposite sides being hollow, said sides and said skirt portions including coacting structure communicating their interiors for free air flow therebetween when said lower portions are swung inwardly, said sides and the lower portions including air outlet openings for discharging air outwardly therefrom into the upper extremeity of said channel and upwardly toward said lower surfaces, respectively, and air pump means carried by said vehicle operative to pump large quantities of air under pressure into said opposite sides, said lower portions including roller means journaled therefrom and rollingly engagable with said lower surface portions when said lower skirt portions are swung inwardly thereunder, the portions of said vehicle defining the upper portion of said channel including friction pad means frictionally engageable with said upper surface portions as said vehicle is lowered downwardly over said monorail member, there being slight clearance between said pad means and said upper surface portions when said lower portions are swung only partly inwardly beneath said undersurface portions for a cushion of air to support said vehicle in elevated position relative to said upper surface portions, said roller means, when said lower skirt portions are swung fully inwardly beneath said undersurface portions, being rollingly engagable with said undersurface portions for pulling said vehicle downwardly relative to said upper surface portion so as to engage said friction pad means with said upper surface portions to brake said vehicle.

2. The combination of claim 1 wherein said lower skirt portions includes means operative to variably throttle the discharge of air from the openings formed in said lower skirt portions.

3. The combination of claim 1 wherein said vehicle includes a longitudinal plenum chamber into which air from said air pump means is discharged, said vehicle also including passage means communicating said plenum chamber with said hollow sides, said passage means including means operative to variably throttle the flow of air from said plenum chamber into said sides.

4. The combination of claim 1 wherein said opposite sides include inwardly facing guide means supported therefrom above said lower skirt portions, said monorail member including upstanding opposite side surfaces with which said guide means carried by said opposite sides are engagable.

* * * * *